(12) United States Patent
Grooten

(10) Patent No.: US 10,765,263 B2
(45) Date of Patent: Sep. 8, 2020

(54) FOOD SKEWER

(71) Applicant: Jay Paul Grooten, Apopka, FL (US)

(72) Inventor: Jay Paul Grooten, Apopka, FL (US)

( * ) Notice: Subject to any disclaimer, the term of this patent is extended or adjusted under 35 U.S.C. 154(b) by 246 days.

(21) Appl. No.: 15/880,408

(22) Filed: Jan. 25, 2018

(65) Prior Publication Data

US 2018/0206680 A1    Jul. 26, 2018

Related U.S. Application Data

(60) Provisional application No. 62/450,357, filed on Jan. 25, 2017.

(51) Int. Cl.
*A47J 43/28*     (2006.01)
*A47J 43/18*     (2006.01)

(52) U.S. Cl.
CPC ............. *A47J 43/283* (2013.01); *A47J 43/18* (2013.01)

(58) Field of Classification Search
CPC ................................ A47J 43/283; A47J 43/18
USPC .................................... 99/419, 421 A, 421 R
See application file for complete search history.

(56) References Cited

U.S. PATENT DOCUMENTS

| | | | | |
|---|---|---|---|---|
| 5,921,588 A * | 7/1999 | Vogel | ................... | F16L 19/086 285/23 |
| 6,354,195 B1 * | 3/2002 | Huang | ................... | A47J 37/04 99/419 |
| 6,386,095 B1 * | 5/2002 | Ausaf | ................... | A47J 37/044 99/419 |
| 6,957,492 B1 * | 10/2005 | Westfall | ................ | A47J 43/288 30/143 |
| 7,104,577 B1 * | 9/2006 | Berke | ...................... | A47J 43/18 294/61 |
| 8,935,992 B2 * | 1/2015 | Axelrod | ............... | A01K 15/025 119/709 |
| 2004/0025709 A1 * | 2/2004 | Sculuca | .............. | A47J 37/0786 99/419 |
| 2004/0239131 A1 * | 12/2004 | Volk | ........................ | A47J 43/18 294/61 |
| 2007/0039484 A1 * | 2/2007 | Leibowitz | ............... | A47J 43/18 99/426 |
| 2008/0047440 A1 * | 2/2008 | Carlson | .................. | A47J 37/042 99/421 A |
| 2010/0229734 A1 * | 9/2010 | Blier | ........................ | A47J 43/18 99/646 R |
| 2014/0261013 A1 * | 9/2014 | Brown | ..................... | A47J 37/04 99/421 R |
| 2017/0203429 A1 * | 7/2017 | Langhammer | ....... | A47G 21/023 |

\* cited by examiner

*Primary Examiner* — Sarang Afzali
*Assistant Examiner* — Darrell C Ford

(57) ABSTRACT

A food skewer that provides a user with the experience of eating meat/food stuff off a bone that is not normally eaten off of a bone, includes a skewing piece and an end cap. The skewing piece is used to pierce and support the desired meat/food stuff, and also provides a portion for the user to grasp in order to maneuver the meat/food stuff. Meanwhile, the end cap secures the meat/food stuff to the skewing piece, protects the user from incurring injury from the skewing piece, and provides an additional portion for the user to grasp in order to maneuver the meat/food stuff. The skewing piece and the end cap may resemble one or more animal bones, such as a humerus bone, a rib bone, or a radius and ulna bone.

5 Claims, 7 Drawing Sheets

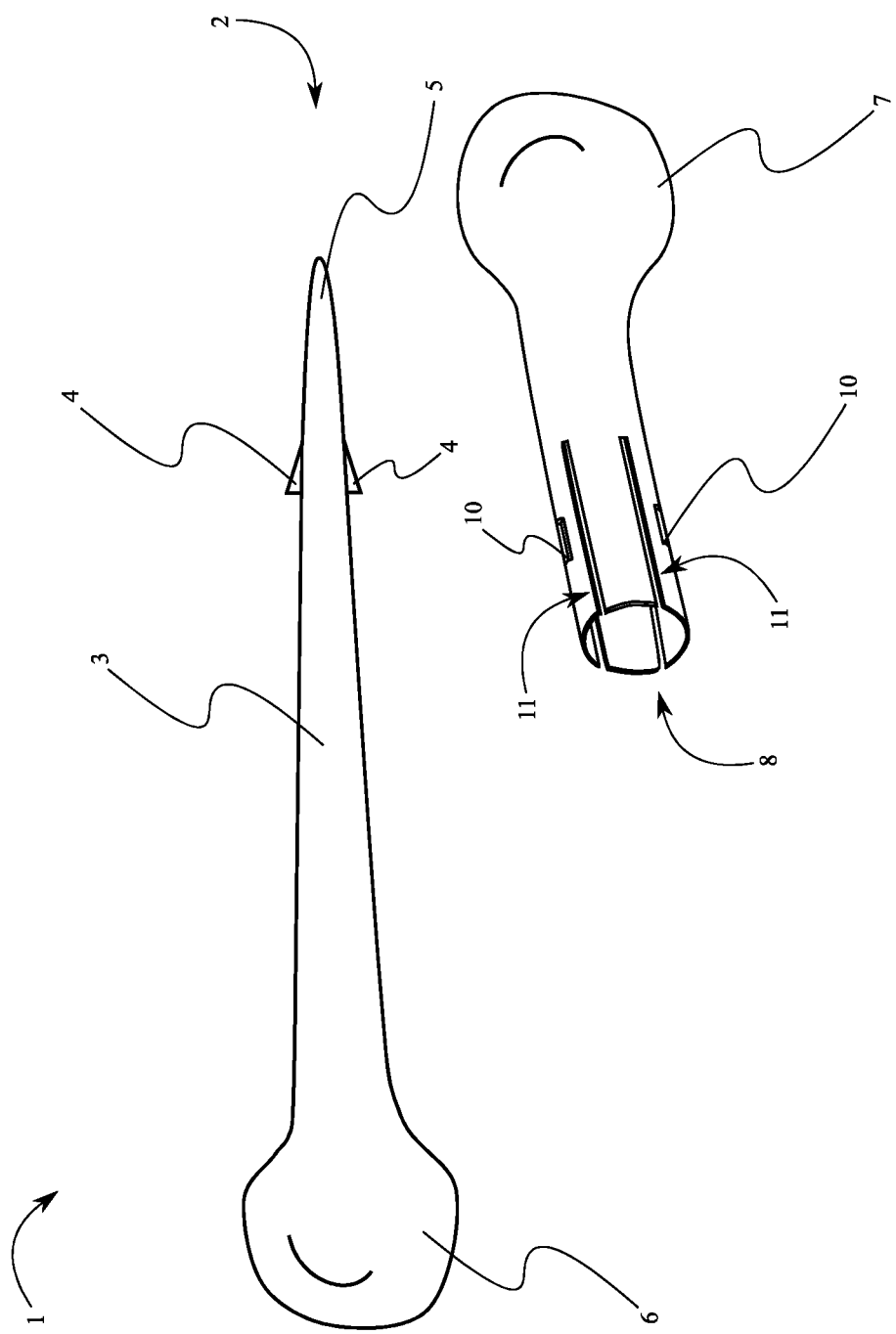

FOOD SKEWER

The current application claims a priority to the U.S. Provisional Patent application Ser. No. 62/450,357 filed on Jan. 25, 2017.

FIELD OF THE INVENTION

The present invention relates generally to food utensils. More specifically, the present invention is a food skewer having two interlocking parts that resemble one or more animal bones.

BACKGROUND OF THE INVENTION

Eating meats can be a messy experience even when using utensils. Having to cut the meat into pieces can take long and can be a tiring experience. As such, there are several meats that are left on the bone, allowing the user to eat with their hands and forgo the arduous process of cutting the meat. While preparing and serving meat on the bone is popular throughout dining establishments, it is a unique experience that is limited to meat. Even further, the experience of eating meat off of the bone is limited to certain cuts of meat. This means that individuals do not have a wide selection of meat types when choosing to eat meat off of the bone. Furthermore, individuals who do not eat meat are not able to enjoy and partake in the experience of eating food off of the bone.

Therefore it is an object of the present invention to provide a food skewer that provides a user with the experience of eating meat/food stuff off a bone that is not normally eaten off of a bone. For example, the present invention can be used with high quality cuts of meat, such as filet mignon, or non-meat products, such as baked goods, candies, meat substitutes, etc. The present invention has two interlocking parts—a skewing piece and an end cap—that may resemble one or more animal bones, to support a desired food and give the user the experience of eating off of the bone. The skewing piece is used to pierce and support the desired meat/food stuff, and also provides a portion for the user to grasp in order to maneuver the meat/food stuff. Meanwhile, the end cap secures the meat/food stuff to the skewing piece, protects the user from incurring injury from the skewing piece, and provides an additional portion for the user to grasp in order to maneuver the meat/food stuff.

BRIEF DESCRIPTION OF THE DRAWINGS

FIG. 7 is a diagram depicting the skewing piece detached from the end cap, wherein the end cap comprises a plurality of slits for accommodating the skewing piece.

DETAIL DESCRIPTIONS OF THE INVENTION

All illustrations of the drawings are for the purpose of describing selected versions of the present invention and are not intended to limit the scope of the present invention.

The present invention is a food skewer that has two interlocking parts that may resemble one or more animal bones. The present invention enables a user to enjoy higher quality food products and meats to be eaten much like chicken wings or ribs, preserving the experience while enhancing the quality of food eaten. The present invention is intended to be inserted into meat/food stuff prior to cooking, baking, grilling, deep frying, or otherwise preparing the meat/food stuff. However, it is also possible for the present invention to be inserted into meat/food stuff subsequent to cooking the meat/food stuff.

Figure 1:
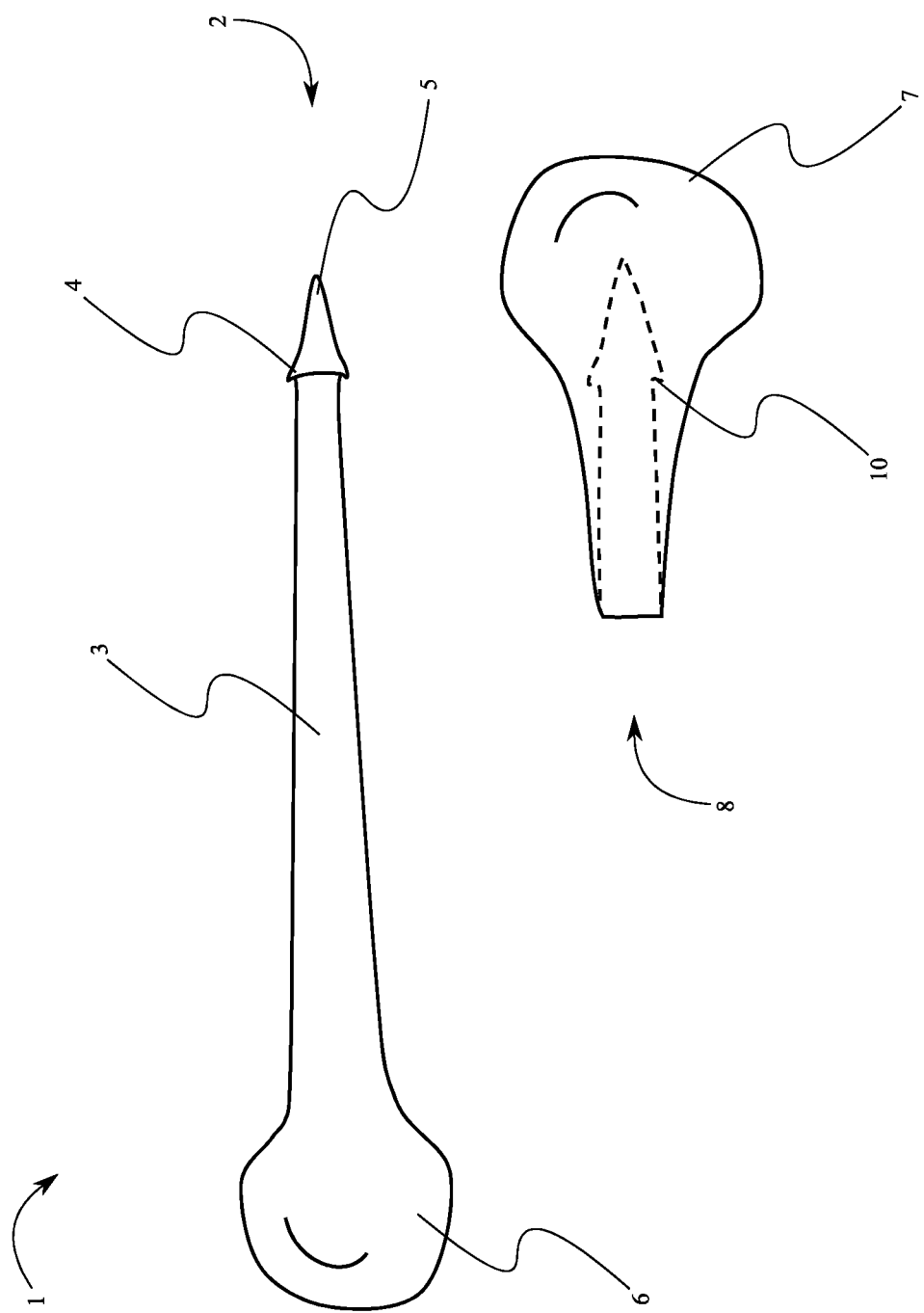
FIG. 1 is a front view showing the skewing piece detached from the end cap, wherein the skewing piece and the end cap are configured to depict a humerus bone.
Figure 2:
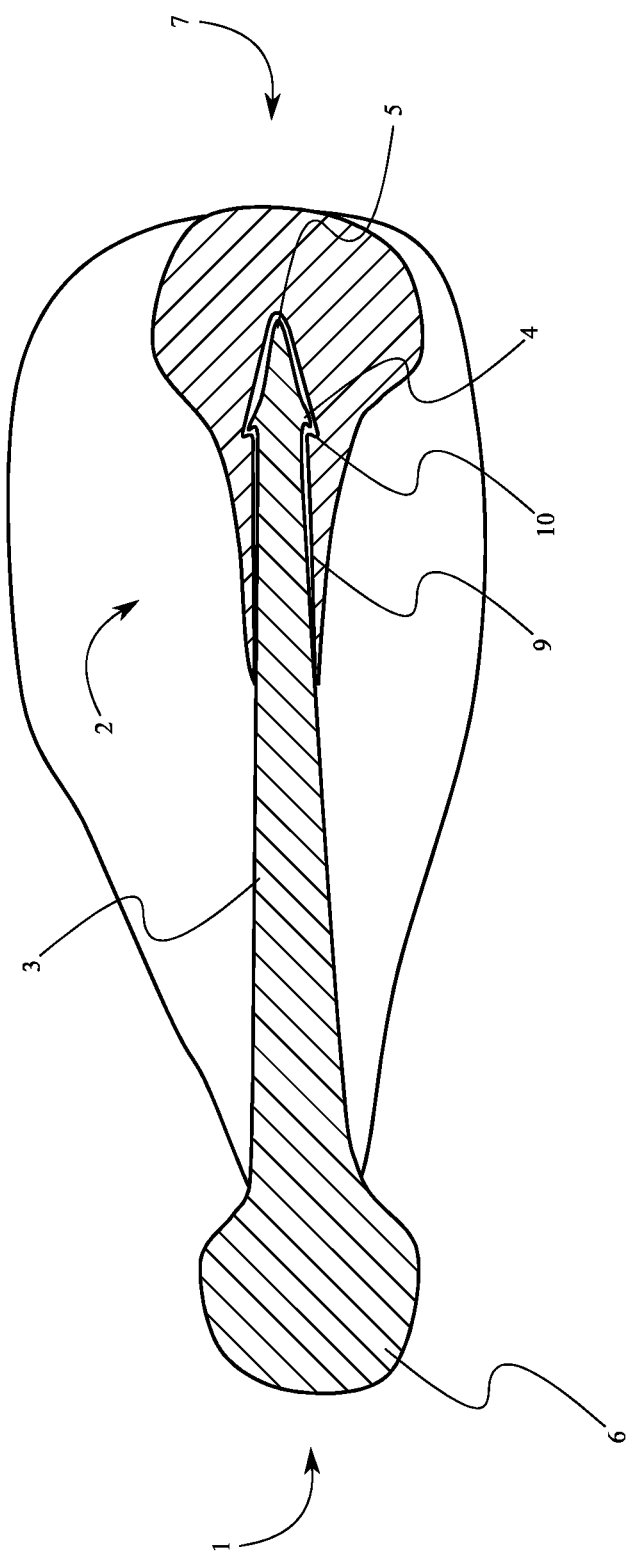
FIG. 2 is a front sectional view of the present invention supporting meat/food stuff, wherein the at least one skewer is positioned into the at least on cavity; the at least one skewer being one skewer and the at least one cavity being one cavity.

In reference to FIG. 1-2, the present invention comprises a skewing piece 1 and an end cap 7. The skewing piece 1 is used to pierce through the meat/food stuff, wherein the skewing piece 1 supports the bulk of the weight of the meat/food stuff. The skewing piece 1 engages with the end cap 7, wherein the end cap 7 is affixed to the skewing piece 1. In preferred embodiments of the present invention, the end cap 7 is permanently affixed to the skewing piece 1 once attached. Furthermore, the skewing piece 1 and the end cap 7 are preferred to be constructed from a biodegradable or renewable source material, such as bamboo. However, in some embodiments of the present invention, the end cap 7 may be removable from the skewing piece 1. Furthermore, the skewing piece 1 and the end cap 7 may be constructed out of reusable materials.

Figure 5:
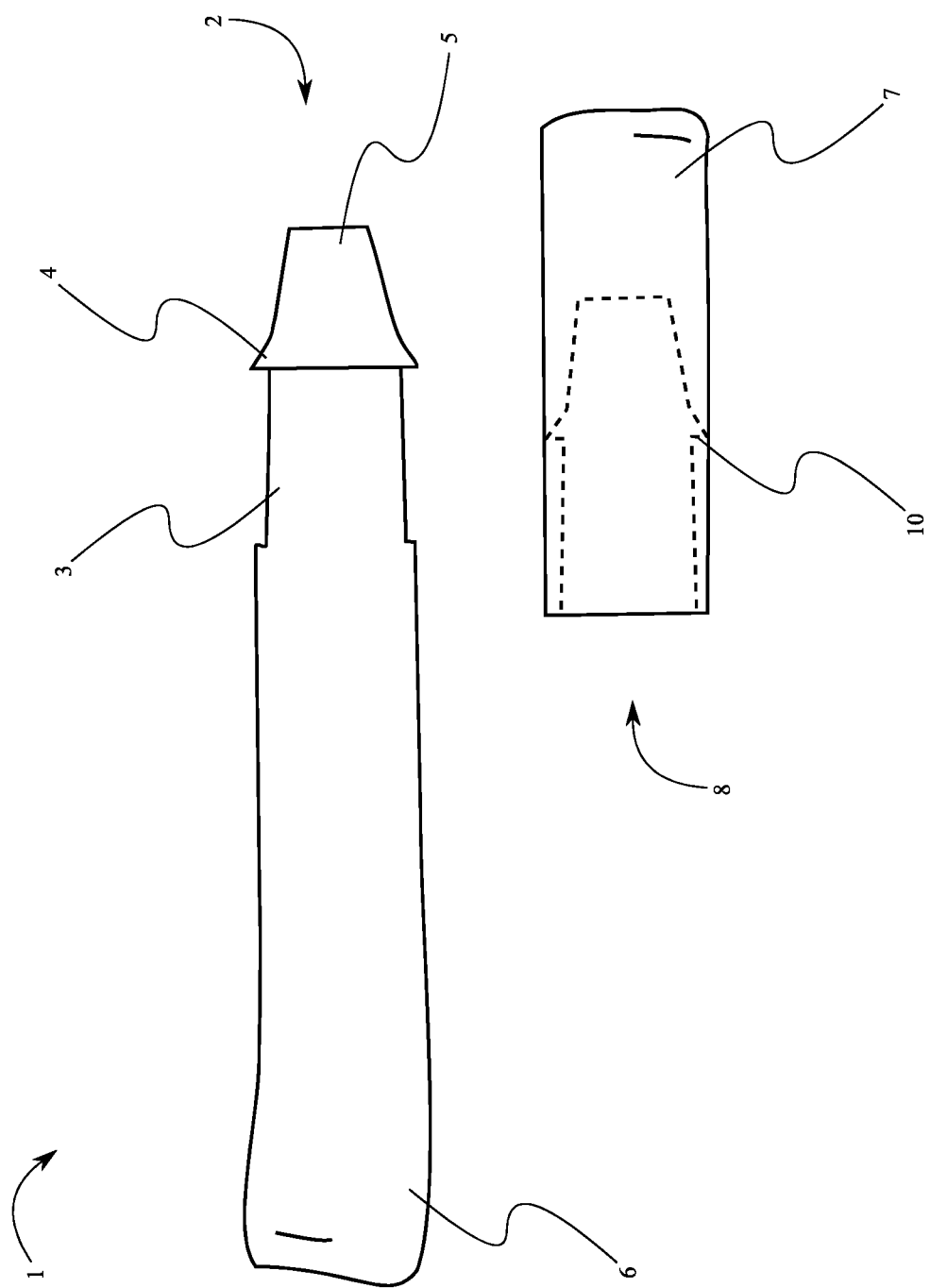
FIG. 5 is a front view showing the skewing piece detached from the end cap, wherein the skewing piece and the end cap are configured to depict a rib bone.
Figure 6:
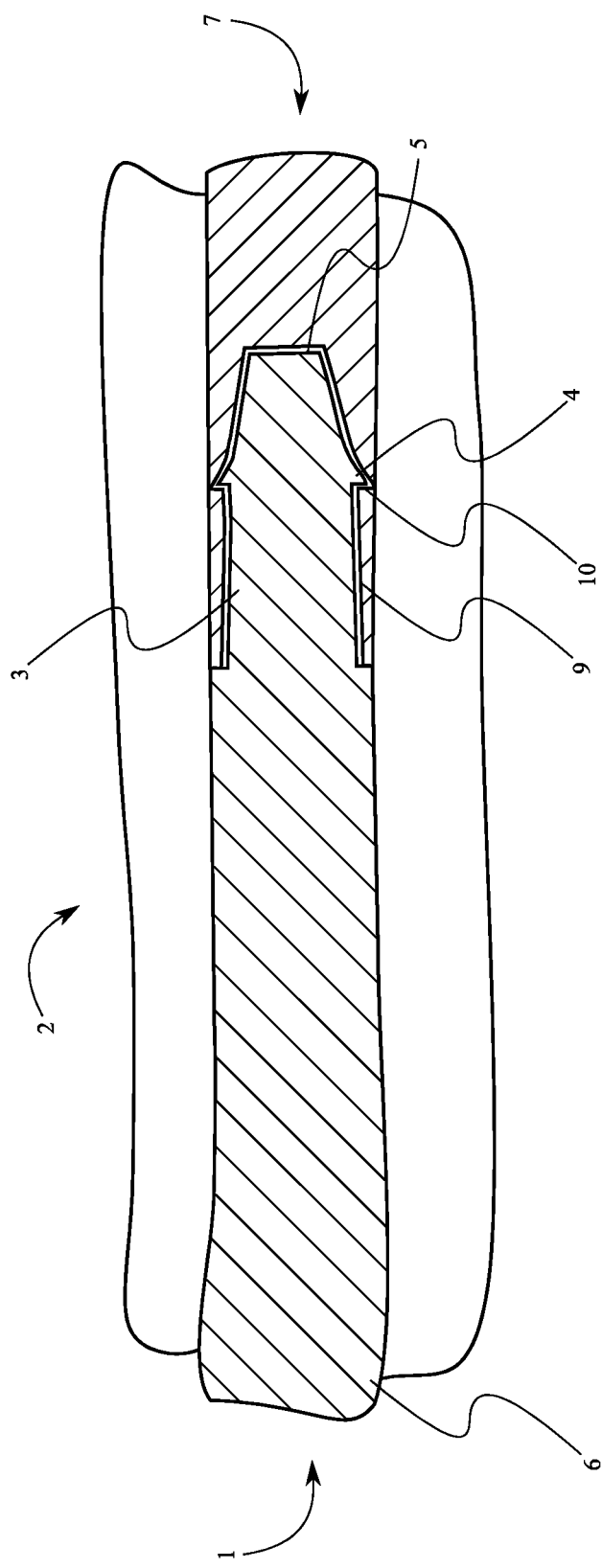
FIG. 6 is a front sectional view of the present invention supporting meat/food stuff, wherein the at least one skewer is positioned into the at least on cavity; the at least one skewer being one skewer and the at least one cavity being one cavity.

The skewing piece 1 and the end cap 7 may be designed to resemble one or more animal bones in order to give the user the desired eating experience. In reference to FIG. 1-2, in one embodiment, the skewing piece 1 and the end cap 7 are shaped to depict a humerus bone in order to give the user the sensation of eating a drumstick. In reference to FIG. 3-4, in another embodiment of the present invention, the skewing piece 1 and the end cap 7 are shaped to depict a radius bone and an ulna bone in order to give the user the sensation of eating a chicken wing. In reference to FIG. 5-6, in yet another embodiment of the present invention, the skewing piece 1 and the end cap 7 are shaped to depict a rib bone in order to give the user the sensation of eating ribs.

In reference to FIG. 1-2, the skewing piece 1 comprises an end piece 6 and an at least one skewer 2, wherein the at least one skewer 2 is adjacently connected to the end piece 6. The at least one skewer 2 is used to pierce through the meat/food stuff, and subsequently support the meat/food stuff. The end piece 6 prevents the meat/food stuff from sliding off of the at least one skewer 2, and provides the user with a surface to grasp while eating the meat/food stuff off of the at least one skewer 2. Once the at least one skewer 2 has been positioned through the meat/food stuff, the end cap 7 is terminally secured to the at least one skewer 2, opposite to the end piece 6. Similar to the end piece 6, the end cap 7 prevents the meat/food stuff from sliding off of the at least one skewer 2, and provides the user with a surface to grasp while eating the meat/food stuff off of the at least one skewer 2.

In further reference to FIG. 1-2, each of the at least one skewer 2 comprises a shaft 3, an at least one retention prong 4, and a piercing tip 5. For each of the at least one skewer 2, the piercing tip 5 is terminally connected to the shaft 3, wherein the end piece 6 is terminally connected to the shaft 3 opposite the piercing tip 5. Furthermore, the piercing tip 5 is tapered away from the shaft 3, thus providing each of the at least one skewer 2 with a pointed or sharpened end that is able to penetrate the meat/food stuff, allowing the skewing piece 1 to be inserted into the meat/food stuff. The at least one retention prong 4 is adjacently connected to the shaft 3, and positioned adjacent to the piercing tip 5, for each of the at least one skewer 2. The at least one retention prong 4 provides a means for interlocking the skewing piece 1 with the end cap 7, such that the end cap 7 cannot be removed from the skewing piece 1.

Each of the at least one retention prong 4 is tapered towards the piercing end. The tapered nature of each of the at least one retention prong 4 allows the shaft 3 to be inserted into the end cap 7 in one direction, while preventing the shaft 3 from being pulled out in the opposite direction, once the shaft 3 has been inserted into the end cap 7 past a certain, predetermined point. The at least one retention prong 4 engages with the end cap 7 in such a manner as to prevent the removal of the shaft 3 without sufficient force and/or deformation to the at least one retention prong 4. Furthermore, the tapered nature of the at least one retention prong 4 assists the piercing tip 5 in the penetration of the meat/food stuff.

In reference to FIG. 1-2, in one embodiment, the at least one retention prong 4 is a single prong, wherein the single prong encompasses the entire circumference of the shaft 3. Furthermore, the single prong merges into the piercing tip 5 to create a piercing end for the at least one skewer 2. The configuration of the piercing end allows for easy penetration of the at least one skewer 2 into the meat/food stuff, while the single prong provides an enlarged contact surface for engaging with the end cap 7.

Figure 3:
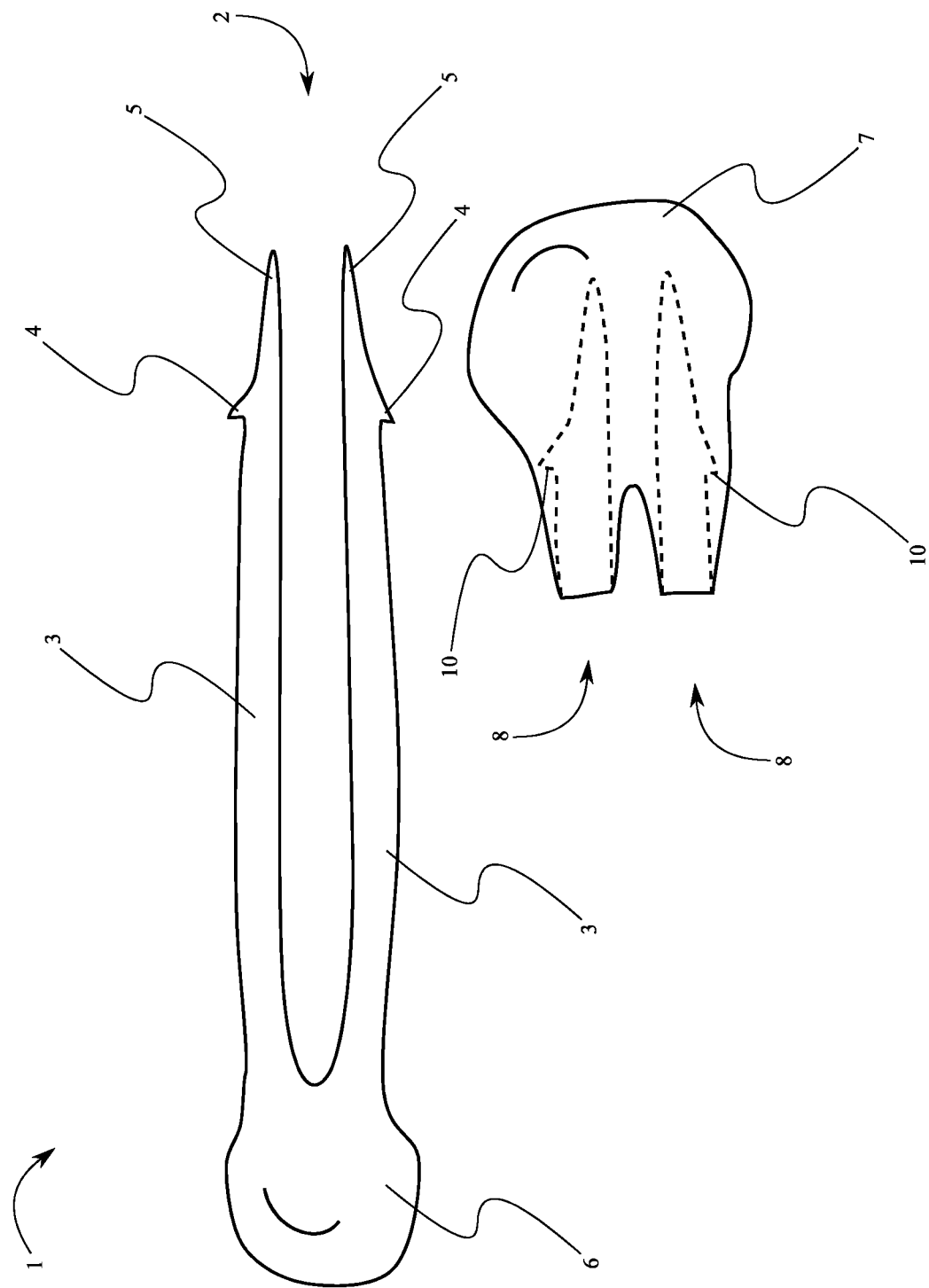
FIG. 3 is a front view showing the skewing piece detached from the end cap, wherein the skewing piece and the end cap are configured to depict a radius and ulna bone.
Figure 4:
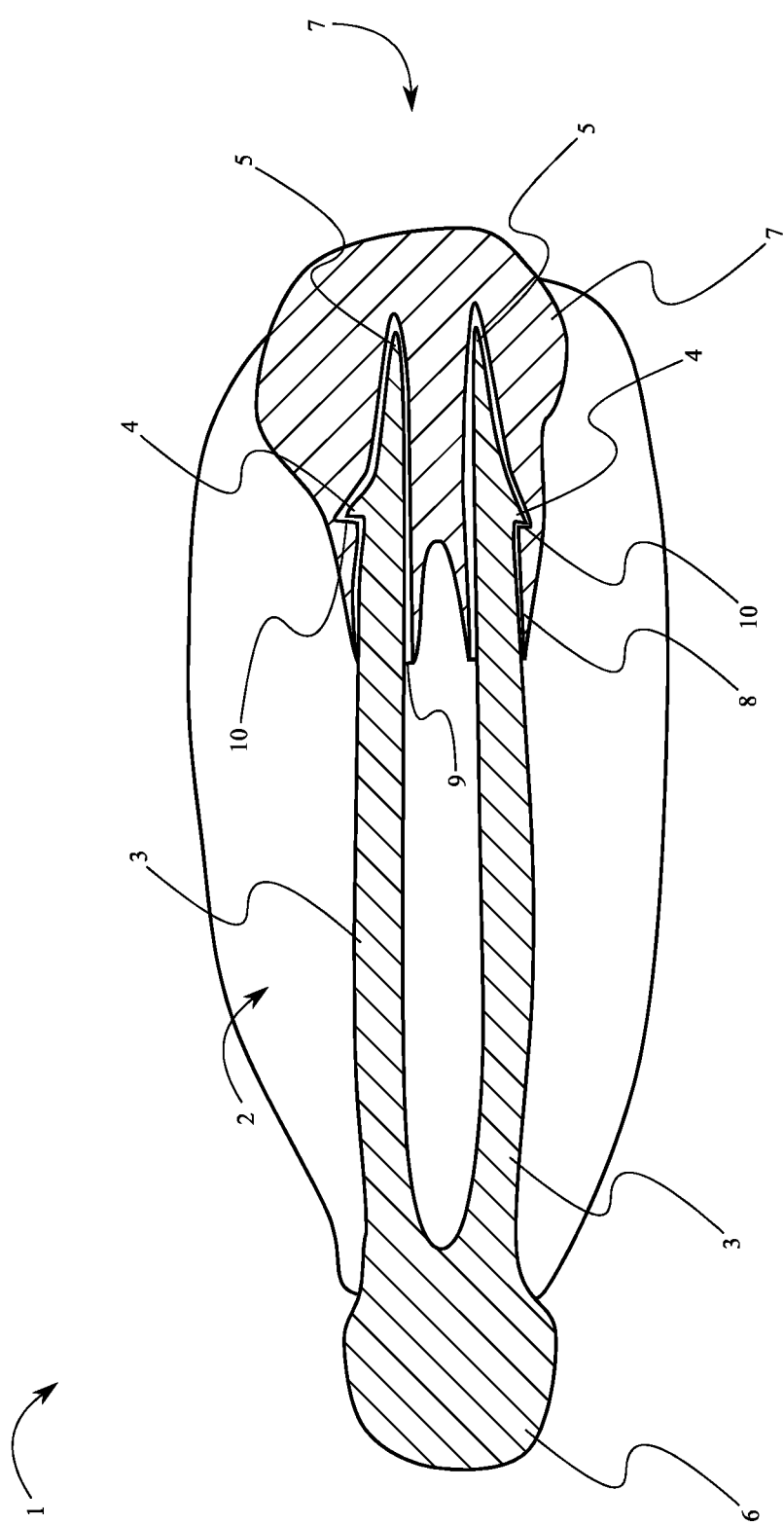
FIG. 4 is a front sectional view of the present invention supporting meat/food stuff, wherein the at least one skewer is positioned into the at least on cavity; the at least one skewer being two skewers and the at least one cavity being two cavities.

In reference to FIG. 3-4, in another embodiment, the at least one skewer 2 comprises a first skewer and a second skewer. The at least one retention prong 4 of both the first skewer and the second skewer is a single prong. The single prong of the first skewer is positioned opposite the second skewer, while the single prong of the second skewer is positioned opposite the first skewer. In this way, the two oppositely oriented prongs provide a connection to both sides of the end cap 7.

In reference to FIG. 7, in another embodiment, the at least one retention prong 4 is a first prong and a second prong. The first prong and the second prong are positioned opposite each other about the shaft 3, such that the first prong and the second prong engage opposite sides of the end cap 7. The configuration of the first prong and the second prong provides a stable, evenly distributed interlocking connection between the skewing piece 1 and the end cap 7.

In yet another embodiment, the at least one retention prong 4 may be a plurality of prongs. Each of the plurality of prongs is radially and equidistantly distributed around the shaft 3 to provide multiple points of contact with the end cap 7 and evenly secure the at least one skewer 2 to the end cap 7. In comparison to embodiments with only the first prong and the second prong, the plurality of prongs provides additional points of contact with the end cap 7, thus providing a more secure connection.

The end cap 7 comprises an at least one receiving cavity 8 for receiving the skewing piece 1; more specifically the at least one skewer 2. The number of the at least one cavity is equal to the number of the at least one skewer 2. For example, in one embodiment the at least one skewer 2 is one skewer, while the at least one cavity is one cavity, as depicted in FIG. 1-2. In another embodiment, the at least one skewer 2 is two skewers, while the at least one cavity is two cavities, as depicted in FIG. 3-4. Each of the at least one skewer 2 is positioned into a corresponding cavity 9 from the at least one receiving cavity 8 in order to securely attach the end cap 7 to the skewing piece 1.

The number of the at least one cavity and the number of the at least one skewer 2 may depend on the desired bone that the skewing piece 1 and the end cap 7 are intended to depict. For example, in embodiments where the skewing piece 1 and the end cap 7 are shaped to depict a humerus bone or a rib bone, the at least one skewer 2 is one skewer and the at least one cavity is one cavity. As another example, in embodiments where the skewing piece 1 and the end cap 7 are shaped to depict a radius bone and an ulna bone, the at least one skewer 2 is two skewers and the at least one cavity is two cavities.

When implementing the present invention, the skewing piece 1 is first driven through the meat/food stuff, wherein the piercing tip 5 penetrates through the meat/food stuff. The end cap 7 is then attached to the skewing piece 1, wherein the piercing tip 5, the at least one retention prong 4, and a portion of the shaft 3 of each of the at least one skewer 2 are positioned into the corresponding cavity 9. In this way, the end cap 7 encapsulates the piercing tip 5 of each of the at least one skewer 2, thus preventing the user from incurring any physical harm, such as being poked or stabbed by the piercing tip 5. Further, the at least one retention prong 4 engages with the end cap 7 in order to secure the skewing piece 1 to the end cap 7.

Each of the at least one cavity delineates a seat 10 that allows the at least one retention prong 4 to engage with the end cap 7, such that the end cap 7 is securely connected to the skewing piece 1. The seat 10 is a portion of the end cap 7 with which the at least one retention prong 4 engages in order to secure the skewing piece 1 to the end cap 7. When the end cap 7 is secured to the skewing piece 1, the at least one retention prong 4 of each of the at least one skewer 2 is engaged with the seat 10 of the corresponding cavity 9. The seat 10 may be configured in various ways and in correspondence to the design of the at least one retention spring. Furthermore, the configuration of the seat 10 may depend on whether the present invention is configured to be disposable or reusable.

In reference to FIG. 1-2, in one embodiment, the seat 10 is formed by a change in diameter of the at least one receiving cavity 8. The at least one receiving cavity 8 is a single cavity having a primary channel and a subsequent cavity. Meanwhile, the at least one skewer 2 is a single skewer, wherein the at least one retention prong 4 is a single prong, and wherein the single prong encompasses the entire circumference of the shaft 3. The primary channel provides the opening into the single cavity and has a diameter that is less than the diameter of the single prong. The subsequent cavity has an initial diameter that is larger than the diameter of the primary channel, and then tapers away from the primary channel to match the profile of the single prong and the piercing tip 5. The single prong and/or the inner wall of the end cap 7 is somewhat flexible to allow the single skewer to be inserted into the single cavity with sufficient force. Once the single prong has eclipsed the primary channel, the wide end of the single prong engages the widened interior surface of the end cap 7, preventing the single prong from being pulled backwards into the primary channel, thus securing the single skewer to the end cap 7.

In reference to FIG. 3-4, in another embodiment, the seat 10 is formed by a change in diameter of the at least one receiving cavity 8. The at least one receiving cavity 8 is a first cavity and a second cavity, each having a primary channel and a subsequent cavity. Meanwhile, the at least one skewer 2 is a first skewer and a second skewer, wherein the at least one retention prong 4 of both the first skewer and the second skewer is a single prong; the single prong of the first skewer being positioned opposite the second skewer, and the single prong of the second skewer being positioned opposite the first skewer. The primary channel provides the opening into the single cavity and has a diameter that is less than the combined width of the single prong and the shaft 3. The subsequent cavity has an initial diameter that is larger than the diameter of the primary channel, and then tapers away from the primary channel to match the profile of the single prong and the piercing tip 5. The single prong and/or the inner wall of the end cap 7 is somewhat flexible to allow the single skewer to be inserted into the single cavity with sufficient force. Once the single prong has eclipsed the primary channel, the wide end of the single prong engages the widened interior surface of the end cap 7, preventing the single prong from being pulled backwards into the primary channel, thus securing the single skewer to the end cap 7.

In reference to FIG. 7, in another embodiment, the seat 10 is formed by a change in diameter of the at least one receiving cavity 8, wherein the at least one receiving cavity 8 is a single cavity and the at least one skewer 2 is a single skewer. The single cavity has a primary channel, a first lateral outlet, and a second lateral outlet. Meanwhile, the at least one retention prong 4 is a first prong and a second prong. The primary channel provides the opening into the single cavity, while the first lateral outlet and the second lateral outlet radially extend from the primary channel and traverse through the walls of the end cap 7 to provide side openings in the end cap 7. The single prong and/or the inner wall of the end cap 7 is somewhat flexible to allow the single skewer to be inserted into the single cavity with sufficient force. The single skewer is positioned into the single cavity, such that the first prong is aligned with the first lateral outlet and the second prong is aligned with the second lateral outlet. The first prong protrudes from the first lateral outlet, wherein the widened end of the first prong extends past the wall of the end cap 7, thus preventing the first prong from being pulled backwards. Similarly, the second prong protrudes from the second lateral outlet, wherein the widened end of the second prong extends past the wall of the end cap 7, thus preventing the second prong from being pulled backwards.

In reference to FIG. 7, in some embodiments of the present invention, the end cap 7 further comprises a plurality of slits 11 that allows a portion of the end cap 7 to flex outward in order to accommodate the skewing piece 1. The plurality of slits 11 is radially distributed about each of the at least one receiving cavity 8, such that the wall of the end cap 7 surrounding the at least one cavity is divided into a plurality of tabs. Each of the plurality of tabs is able to flex outwards in order to temporarily expand the at least one receiving cavity 8. When the skewing piece 1 is inserted into the at least one cavity, each of the at least one retention prong 4 engages with one of the plurality of tabs, pushing the tab outwards as the skewing piece 1 is inserted into the end cap 7. Once the at least one prong engages the seat 10, each of the plurality of tabs is able to flex back inwards around the shaft 3.

Although the invention has been explained in relation to its preferred embodiment, it is to be understood that many other possible modifications and variations can be made without departing from the spirit and scope of the invention as hereinafter claimed.

What is claimed is:

1. A bone shaped skewer comprising:
a skewing piece;
an end cap;
the skewing piece comprising at least one skewer and an end piece;
each of the at least one skewer comprising a shaft, at least one retention prong and a piercing tip;
the end cap comprising at least one receiving cavity and a plurality of slits;
the piercing tip being terminally connected to the shaft;
the piercing tip being tapered away from the shaft;
the at least one retention prong being laterally connected to the shaft;
the at least one retention prong being positioned adjacent to the piercing tip;
the at least one retention prong being tapered towards the piercing tip;
the end piece being terminally connected to the shaft opposite the piercing tip, for each of the at least one skewer;
each of the at least one receiving cavity delineating a seat;
the plurality of slits being radially distributed about each of the at least one receiving cavity;
the shaft, the at least one retention prong and the piercing tip of each of the at least one skewer being positioned into a corresponding receiving cavity among the at least one receiving cavity; and
the at least one retention prong of each of the at least one skewer being engaged with the seat of the corresponding receiving cavity.

2. The bone shaped skewer as claimed in claim 1, wherein the at least one skewer is one skewer and the at least one receiving cavity is one cavity.

3. The bone shaped skewer as claimed in claim 1, wherein the at least one skewer is two skewers and the at least one receiving cavity is two cavities.

4. The bone shaped skewer as claimed in claim 1, wherein the skewing piece and the end cap depict a humerus bone.

5. The bone shaped skewer as claimed in claim 1, wherein the skewing piece and the end cap depict a rib bone.

* * * * *